Sept. 4, 1956

H. C. CUSKIE 2,761,714

MOUNTING DEVICE

Filed Aug. 12, 1950

INVENTOR.
Herman C. Cuskie.
BY
Harness and Harris
ATTORNEYS

Sept. 4, 1956 H. C. CUSKIE 2,761,714
MOUNTING DEVICE
Filed Aug. 12, 1950 2 Sheets-Sheet 2

INVENTOR.
Herman C. Cuskie.
BY
Harness and Harris
ATTORNEYS.

United States Patent Office 2,761,714
Patented Sept. 4, 1956

2,761,714

MOUNTING DEVICE

Herman C. Cuskie, Birmingham, Mich., assignor to Chrysler Corporation, Highland Park, Mich., a corporation of Delaware Application August 12, 1950, Serial No. 179,033

4 Claims. (Cl. 287—85)

This invention relates to fastening means and to mounting devices incorporating the same for support bars or the like. The present application is a continuation-in-part of my copending application Serial No. 85,115, filed April 2, 1949, now Patent 2,626,797.

According to a feature of the invention, provision is made to mount adjacent metal members together without metal-to-metal contact and without resort to threaded clamps and faseners. The attachment is simply accomplished by the provision of cooperating elastic and hinged elements, each of which coacts to retain the other in place.

According to another feature of the invention, a bipartite hinge device is provided, the parts of which may be identical and interchangeable so as to simplify assembly problems.

According to still another feature, provision is made for a bipartite hinge device, the parts of which are detachably separable prior to final assembly. Thereafter the parts are mutually restrained against separation.

According to yet another feature of the invention, an elastic type mounting is provided for use in an automobile or other vehicle ride control device in which the parts may be line assembled without the necessity for power driven screw drawing mechanisms and other special tools.

According to a further feature of the invention, a mounting device may be provided which is conveniently removed from an assembled condition by a simple motion of a screw driver or the like and which will not become disassembled or released by vibration or bumping.

Other features, objects, and advantages will either be specifically pointed out or will become aparent when, for a better understanding of the invention, reference is made to the following description taken in conjunction with the accompanying drawings in which.

Referring to the drawings wherein similar numerals identify similar parts of the mounting device of my invention, I have shown my invention for purposes of illustration only as applied to a mounting device for an automobile stabilizer bar.

Figure 1:
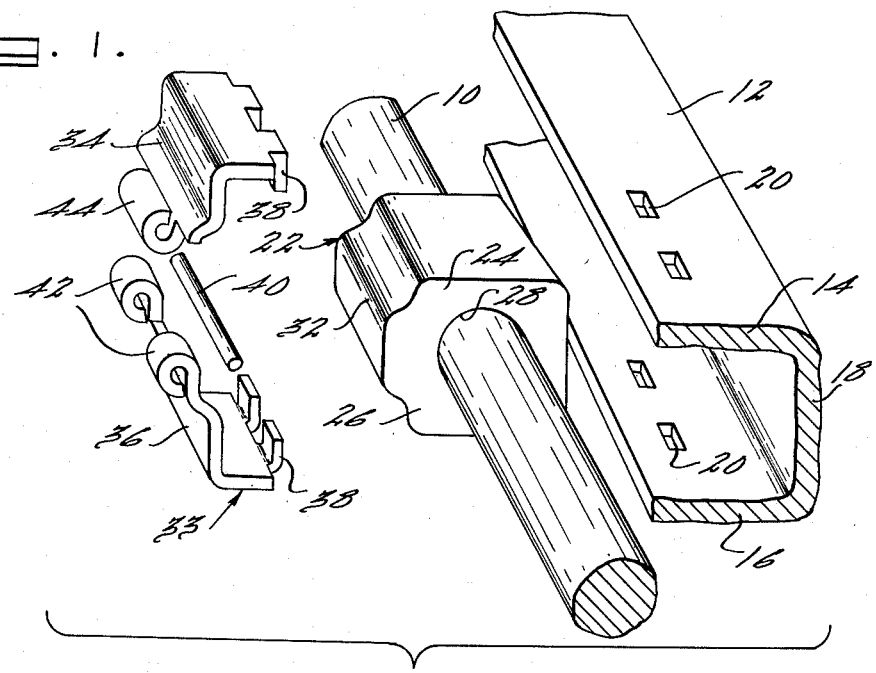
Figure 1 is an exploded isometric view of the parts of the fastening means and mounting device of my invention.
Figure 2:
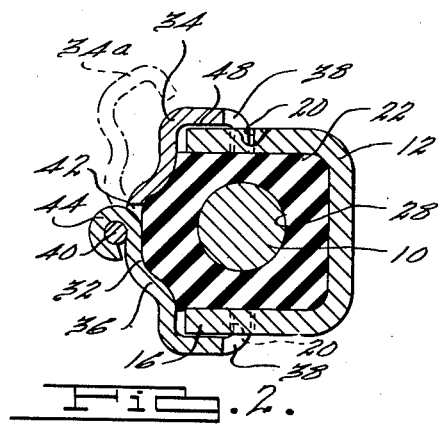
Figure 2 is a transverse section through the mounting device of Figure 1.

As particularly shown in Figures 1 and 2, an elongated member 10, which may be constituted by a portion or portions of a stabilizer bar, conduit or the like, of an automobile suspension, is adapted to be received in a substantially rigid supporting member 12 which may, for example, be the wishbone of an automotive wheel suspension. Member 12 may be of rigid channel section having opposed legs 14 and 16 connected by a body web or base portion 18. Provided in the opposite legs 14 and 16, are lug-receiving apertures, slots, or openings 20. Aiding in the retention of member 10 in channel 12 is an elastic cushion element generally described by the numeral 22, and which in Figure 1 is shown to be a solid collar-like member. Cushion 22 may be of an elastic rubber or rubber-like material, or other suitable elastically deformable resin or plastic material. The cushion 22 has a central opening 28 preferably of slightly smaller dimension than the elongated member 10 and into which is directly received this member. Cushion 22 along with the member 10, is held in the channel 12 adjacent lug-receiving apertures 20 in the latter, as better seen in Figure 2. A protruding portion or nose 32 is preferably provided on the cushion 22 in a manner such as to extend beyond the extremities of the legs 14 and 16 of the channel 12 when the cushion 22 occupies the interior of the channel. In order to secure the element 10 together with the cushion 22 in the channel 12, I provide a fastening means generally designated by the numeral 33 and comprising leaf parts 34 and 36 cooperating to form a bipartite hinge device. Each leaf part 34 and 36 is provided with one or more lugs 38 to be received in the apertures 20 of the channel 12 for positive interlocking action therewith. Along the inner ends of parts 34 and 36 are formed one or more pin-receiving eyes 42 and 44 respectively, adapted mutually to receive a pin 40. One eye 44 is formed on the part 34 and two eyes are formed on the part 36. Upon assembly of these hinge parts, eye 44 is received intermediate the opposed eyes 42 of the part 36. In employing the mounting device of my invention in Figure 1, the cushion 22 will first be installed on the member 10 as by forcing the end of the member 10 through the aperture 28 of the cushion and sliding the cushion axially along the member 10 to the desired axial location thereon. The cushion and bar are now brought into nesting relation with the channel 12 as seen in Figure 2, adjacent the apertures 20 therein. The hinge parts which have been previously assembled with the pin 40 are next brought into position relative to the channel 12. The lugs 38 of one of the parts, for example, the part 36 being introduced in the apertures 20 of the leg 16 of the channel 12. Pivoted to part 36 by means of the pin 40, the other bipartite part 34 is now swung into place in adjacency to the apertures formed in the opposed leg 14 of the channel from its initial position 34a. Compression of the cushion 22 adjacent protruding portion 32 will permit the lugs 38 of the part 34 to be brought into transverse registration with the apertures 20 of leg 14 and be snapped into reception therein. Cushion 22 will thereby remain compressed as between the web 18, legs 14 and 16 on the bipartite hinge device such as to positively grip the elongated member 10 within the opening 28 and provide a resilient bearing for the member 10 and will further exert an outward force at the hinge point of the bipartite hinge device to retain the hinge assembly in position in interlocking engagement with the apertures of the channel 12. Removal of the bipartite hinge device may readily be accomplished by simply inserting a prying tool, for example, a screw driver in the gap indicated at 48 in Figure 2 and snapping the lugs 38 out of reception in the lug-receiving apertures 20, the nose portion of the cushion being temporarily additionally compressed in this procedure.

Figure 3:
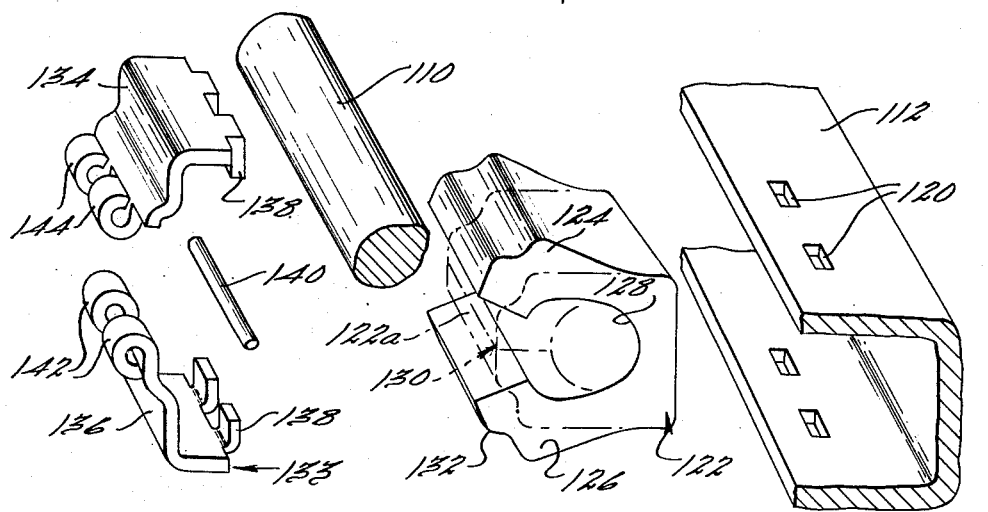
Figure 3 is an exploded isometric view of my invention showing a slightly modified form of fastening means and cushioning element.
Figure 4:
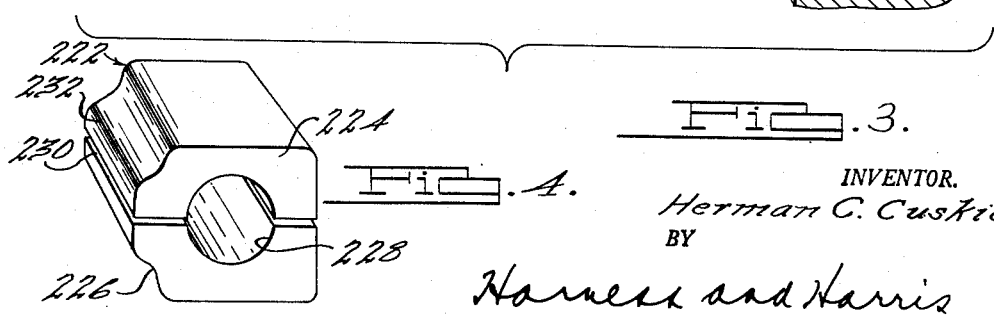
Figure 4 illustrates a further modified form of cushioning element used in my invention.

Referring now in particular to Figures 3 and 4, a channel 112 similar to that in Figure 1 may be provided with lug-receiving apertures 120. The elastic cushion member generally designated by the numeral 122 is here provided with upper and lower portions 124 and 126 adapted to be separated along one side only thereof at a separation line generally designated by the numeral 130. The portions 124 and 126 when spread apart define an open-sided opening 128 for suitable reception of an elongated member 110 similar to the member 10 of Figure 1. Alternatively the cushion member 122 may be of the form generally designated by the numeral 222 of Figure 4 and have upper and lower portions 224, 226 which are completely separable from one another along the line generally designated by the numeral 230 and the inner portions fo the parts 224, 226 being cupped out such that when the parts 224, 226 are brought into adjacency with one another along the separating line 230 they cooperate to define a central opening 228 into which may be directly received the elongated member 110. After elongated member 110 is received in the opening 128, the cushion member will be restored to the position 122a in Figure 3. If the cushion of Figure 4 is employed, the parts 224, 226 thereof will be brought into the position shown in this figure.

The fastening means of the mounting device of the invention in Figure 3 comprises a bipartite hinge having identical parts 134, 136. Each part may be provided with one or more lugs 138 symmetrically arranged relative to the ends thereof and adapted to be received in lug-receiving openings 120 of the channel 112, two spaced apart lugs 138 being shown. The parts 134, 136 of the hinge may be provided with one or more eyes 112 and 144 respectively unsymmetrically arranged relative to the ends thereof, two each being shown in Figure 3 and spaced or offset for interengagement and reception of a hinge pin 140. It will be noted that the eyes 142 and 144 will be offset relative to each other when the parts are moved into assembled relation with the ends of the parts transversely aligned. Assembly of the mounting device of Figure 3 will be generally similar to the assembly described with respect to the arrangement in Figures 1 and 2 with this difference that the cushion member 122 will be brought into assembled relation with the elongated member 110 by spreading apart the portions 124 and 126 of this cushion, instead of forcing the cushion over the bar as described with respect to the cushion 22. If the cushion of Figure 4 is employed, the two parts 224, 226 thereof will be brought initially into the position shown in Figure 4 on the bar 110. It will be understood that the apertures 128 and 228 provided by the cushioning members in Figures 3 and 4 will be slightly smaller than the dimension of the bar 110 to be received therein. It may be noted at this point that the cushion member constructions of Figures 3 and 4 have more universal appliction than that of Figure 1 in that the cushions of Figures 3 and 4 may be readily assembled to bar members of crooked character or to reduced sections of such members. It will be understood that the cushion of Figures 3 and 4 may be employed with the fastening means of Figure 1 and vice versa, the cushioning means of Figure 1 may be employed with the fastening means of Figure 3.

Figure 5:
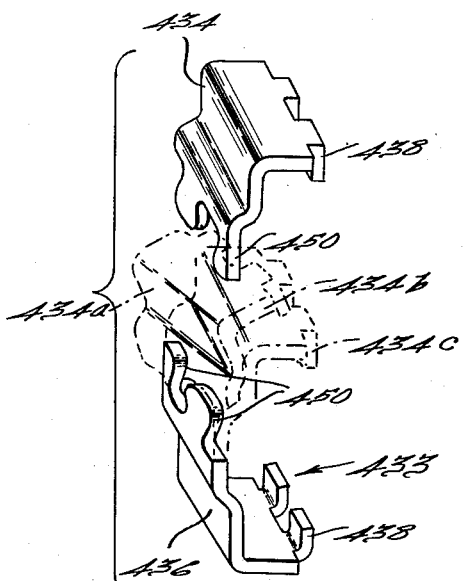
Figures 5, 6, and 7 illustrate further modifications of the fastening means of my invention.
Figure 6:
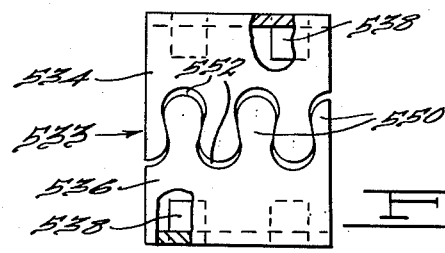
Figure 7:
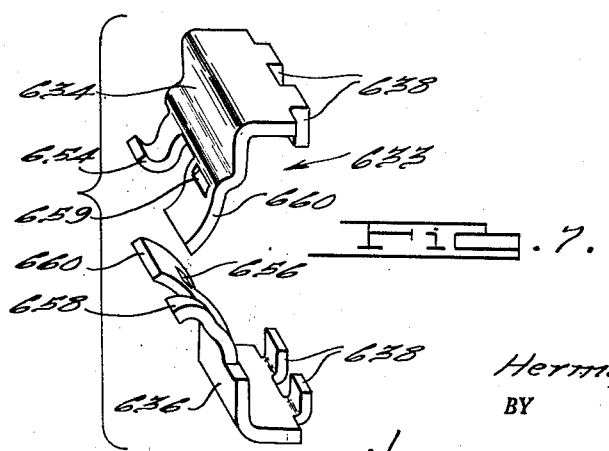

Figures 5, 6, and 7 show modified forms of the fastening means of my mounting device and which may be employed, if desired, in place of the fastening means 33 and 133 of Figures 1 and 3 respectively. Referring to Figure 5, parts 434 and 436 forming the bipartite hinge in this figure, carry lugs 438 suitable for reception in apertures of channels similar to the channels shown in the preceding figures. Each part 434 and 436 is provided with a pair of reentrant angled lugs 450 adapted to interengage one another. Sufficient clearance is provided between the ends of the reentrant angled lugs 450 for the parts on assembly to have limited relative motion or hinging action relative to one another. Thus it can be seen that once part 434 is assembled with part 436, the former part may be formed from the relative position 434ᵃ to the positions indicated at 434ᵇ and 434ᶜ. Such movement is sufficient to permit the bipartite hinging device to be applied to a rigid channel section.

With respect to Figure 6, the bipartite hinge parts 534 and 536 have lugs 538 adapted to be received in lug-receiving apertures such as provided by a rigid channel. The three reentrant angled lug portions 550 formed on parts 534 and 536 interengage in a similar fashion to the lugs of Figure 5 previously described, and vary only as to number. The lugs on part 534 will be observed to have clearance at their ends relative to the reentrant angled lugs on companion part 536 such as is indicated at 552 in order to provide for limited hinging motion necessary to the operation of the bipartite hinge device.

As respects Figure 7, the bipartite parts 634 and 636 are provided with lugs 638 for suitable reception in lug-receiving apertures of a rigid channel or similar structure. At the inner ends of parts 634 and 636 will be observed one lug portion or member 654 adapted to be received in an eye 656 formed on the complemental part 636. A similar lug portion 658 formed on part 636 is adapted to be received in an eye 659 formed on part 634. The portions 660 on the respective part in which are formed eyes 656 and 659, are arranged such as to engage the backs of the bipartite hinge device on assembly and prevent excessive opening between the parts. In order to assemble parts 634 and 636 initially, a slight twisting or rocking motion is recommended in order that lug portions 654 and 658 may be properly received in the openings 656 and 659 respectively.

It is to be noted that the companion bipartite hinge parts in Figure 3 as well as the bipartite type hinge parts shown in Figures 5, 6, and 7 respectively, are identical to one another rather than being right and left hand parts. Then by suitably opposing any two of the companion parts in Figure 3 or in Figures 5, 6, and 7, a hinge device can readily be assemled without confusion and without loss of time, since each identical part is so offset as to accommodate reception of any other part along the inner edges thereof. It will be understood that the fastening means of Figures 5, 6, and 7 may be employed in conjunction with any of the cushioning members shown in the preceding figures.

Variations within the spirit and scope of the invention are equally comprehended by the foregoing description.

What is claimed is:

1. In a self-locking mounting device capable of securing an elongated member within a channel, the latter having two opposed sides and an open side, a deformable and resilient body surrounding said elongated member, a pair of structurally rigid clamping plates, a lug formed on one end of each of said plates, means for hinging the other ends of said plates together to accommodate a relative pivotal movement of said plates, an aperture formed in each of the opposed sides of said channel, said apertures receiving said lugs, the latter extending toward the interior of said channel, said resilient body being engaged by said plates and resiliently compressed thereby, said hinged ends being urged by said resilient body with a force tending to move the plates away from said channel thereby causing said lugs to become locked within their associated channel apertures, said hinging means being defined in part by interengaged overlapping ends of said plates.

2. In a self-locking mounting device capable of securing an elongated member within a channel, the latter having two opposed sides and an open side, a deformable and resilient member surrounding said elongated member, a pair of structurally rigid clamping leaves, a lug formed on one side of each of said leaves, at least one projection formed on the other side of one of said leaves and at least two projections formed on the other side of the other of said leaves, the projections on the other of said leaves defining therebetween a re-entrant recess, the width of each of said projections being greater at the outer end portion thereof than at the base, the projection on said one of the leaves being adapted to cooperate with and to be received within the re-entrant recess formed on said other of the leaves to form a hinge connection therebetween, said hinge connection providing for a relative pivotal movement of said leaves, at least one aperture formed in each of the opposed sides of said channel, said apertures receiving said lugs, the latter extending toward the interior of said channel, said resilient member being engaged by the hinged ends of said leaves and resiliently compressed by the same, said hinged ends being urged by said resilient member with a force tending to move said plates away from said elongated member thereby causing said lugs to become locked within their associated channel apertures.

3. The combination as set forth in claim 1 wherein said hinging means comprises at least one eyelet portion formed integrally with one of said plates at the other end thereof and two other eyelet portions integrally formed on the other end of said plates, said two other eyelet portions being aligned in adjacent relationship with respect to said one eyelet portion, and a hinge pin received through said aligned eyelets.

4. In a self-locking mounting device capable of securing an elongated member within a channel, the latter having two opposed sides and an open side, a deformable and resilient element surrounding said elongated member, a pair of structurally rigid clamping leaves, at least one lug formed on one end of each of said leaves, projections formed on the other end of each of said leaves in axially spaced and adjacent relationship, one of the projections for each leaf defining a hook, an aperture formed in the other projection of each leaf, the hook and aperture for one leaf being adapted to cooperate with and interengage the aperture and hook of the other leaf respectively to form a hinge connection therebetween, said one leaf being similar to and interchangeable with said other leaf, said hinge connection accommodating a relative pivotal movement of said leaves, at least one aperture formed in each of the opposed sides of said channel, said channel apertures receiving said lugs, the latter extending toward the interior of said channel, said resilient element being engaged by the hinged ends of said leaves and resiliently compressed by the same, said hinged ends being urged by said resilient element with a force tending to move said leaves away from said elongated member thereby causing said lugs to become locked within their associated channel apertures.

References Cited in the file of this patent
UNITED STATES PATENTS

| | | |
|---|---|---|
| Re. 23,116 | Utz | May 24, 1949 |
| 431,010 | Rutzler | June 24, 1890 |
| 906,806 | Kortick et al. | Dec. 15, 1908 |
| 934,804 | Folger | Sept. 21, 1909 |
| 1,079,758 | Gray | Nov. 25, 1913 |
| 1,376,284 | Kohn | Apr. 26, 1921 |
| 1,659,822 | Innes | Feb. 21, 1928 |
| 1,698,571 | Van Cleve | Jan. 8, 1929 |
| 1,804,958 | Stebbins | May 12, 1931 |
| 2,310,803 | Miller | Feb. 9, 1943 |
| 2,365,985 | West | Dec. 26, 1944 |
| 2,464,653 | Phipps | Mar. 15, 1949 |
| 2,517,611 | Utz | Aug. 8, 1950 |
| 2,547,813 | Coones et al. | Apr. 3, 1951 |

FOREIGN PATENTS

| | | |
|---|---|---|
| 471,979 | Germany | June 24, 1924 |
| 777,954 | France | Mar. 6, 1935 |